United States Patent Office 3,345,501
Patented Oct. 3, 1967

3,345,501
ELECTRICAL AGGREGATING APPARATUS FOR USE IN TOTALISATORS AND LIKE SYSTEMS
Roy Ernest Wells, Seaforth, New South Wales, Australia, assignor to Electra Totalisators Pty. Limited, Lidcombe, New South Wales, Australia, a corporation of New South Wales, Australia
Filed Sept. 23, 1963, Ser. No. 310,712
6 Claims. (Cl. 235—92)

ABSTRACT OF THE DISCLOSURE

Aggregating apparatus for totalisator systems which utilizes decimal stepping counters one for each digit of the summated total, control relays receiving signals in respect of different money values and originating energising impulses for respective counters, the control relays being double-acting to either one of two bistable conditions and being provided with contact groups one of which is transiently operated by energisation of its relay and another being changed between two stable states by energisation of the relay, all of the double-acting relays having a home condition and being displaced therefrom upon receipt of an input signal and being returned thereto by contacts on the respective counter after the counter has responded to its respective control relay.

---

This invention relates to aggregating, i.e. collecting and totalling, apparatus for use in connection with racecourse automatic totalisators and similar computing systems, and more particularly such apparatus which is designed to collect all of a plurality of different money values offered to it in the form of electrical input signals.

In systems of aggregation, and accumulation, of different input values such as would be encountered under the operating conditions of automatic totalisators, or automatic bookmaking machines, no great difficulty is encountered in the design of the apparatus if the different input values are so related as to be multiples of each other, more particularly if the values subsequent to the lowest are double the next lowest input value. Such a system might involve merely the use of a binary system of relays or other electrical components which by virtue of the change of state of the relays arranged in a chain could represent a sum total of the input values applied.

In copending application No. 146,389 there is described an automatic bookmaker machine capable of accepting wagers involving a great variety of stake values, and uses a coding method of the total stake value whose elements incorporate a conversion from one progression sequence to another, the commencing element of which later sequence is not a multiple of the concluding element of the first sequence. In one form the said code involves elements of ½, 1, 2, 4, 5, 10, 20 and 40.

Popular stake values available to the patrons of many automatic electric totalisators at present in use are $2, $5, $10 and $50. The progression sequence of these values differs from that for which the equipment of the said patent application was designed to handle. Whereas each sequence of the former code consists of a true binary progression, i.e. by even multiples, there is no such relationship between the values of the above stakes. The prior equipment would not then be suitable for collection of these values.

Decimal counting systems involving sequentially stepping switches or the like are known which would readily provide for collection and totalling of code element values of say 1, 10, 100, etc. i.e. of decimal progression sequence. However, difficulties may arise where other elements of the code do not have values corresponding to single digits of the decimal sequence. This is not necessarily so in all instances, for example the value of $2 referred to above may be provided for by arranging the digits counter to signify a value of 2 per step and having five steps per sequence, or even ten steps thus constituting a repeated sequence. A difficulty is encountered, however, when collection and totalling of a $5 value is also required.

It is the object of this invention to provide aggregating equipment capable of collection and totalling of values in the relationship of 2:5.

Another object is to provide aggregating equipment which additionally is capable of collecting and totalling values in the order of 10 and 50 to facilitate the use of a code sequence 2, 5, 10 and 50.

A further object is to provide such equipment which is relatively simple of construction and efficient in operation.

There is no necessity for visual indication of the progressive total at the aggregator but this condition will be found in most cases to be desirable. In every case, however, signalling of an electrical condition representative of the total must be provided for. An ideally suited visual indicator is described in copending application No. 310,711 but other forms of indicators may be used for this purpose.

According to the invention there is provided electrical aggregating apparatus for collecting, and computing the total value of, units of different values represented by individual input signals, in which the different values are in the relationship of 5: any whole number of lower value, the apparatus comprising a sequentially stepping decimal counting device, at least two stages in said device, one stage being individual to the counting of the units digits in the computed total and another stage being individual to the counting of the tens digits in the computed total, a two positioned device connected to input signals representative of a 5 value and to the units digits counter to receive an input signal therefrom every time the progressive total at least equals another multiple of 5, and means controlled by the two positional device for performing two alternate functions in response to input signals applied thereto, one function being separate indication of a 5 value addition to be made to the otherwise indicated total and the other function being to step on one position the tens digits stage of the stepping device with simultaneous cancellation of the previously indicated 5 value addition.

The invention will be described with reference to the accompanying drawings, in which.

Basically the aggregating apparatus of this invention is intended to function in an electric totalisator as the automatic totalling means for all stakes wagered in respect of an individual contestant. It could also serve to total the gross "take," i.e. all monies wagered on the totalisator, or be used for similar purposes. The apparatus must, in the present instance of a totalisator providing for bets at units of $2, $5, $10 and $50, be capable of collecting these different value stakes and distinguishing between them. Signals representative of these values will be applied to the apparatus as input signals and after computing the progressive total of the values electrical output signals will be produced by the aggregating apparatus indicative of the total value computed.

Figure 1:
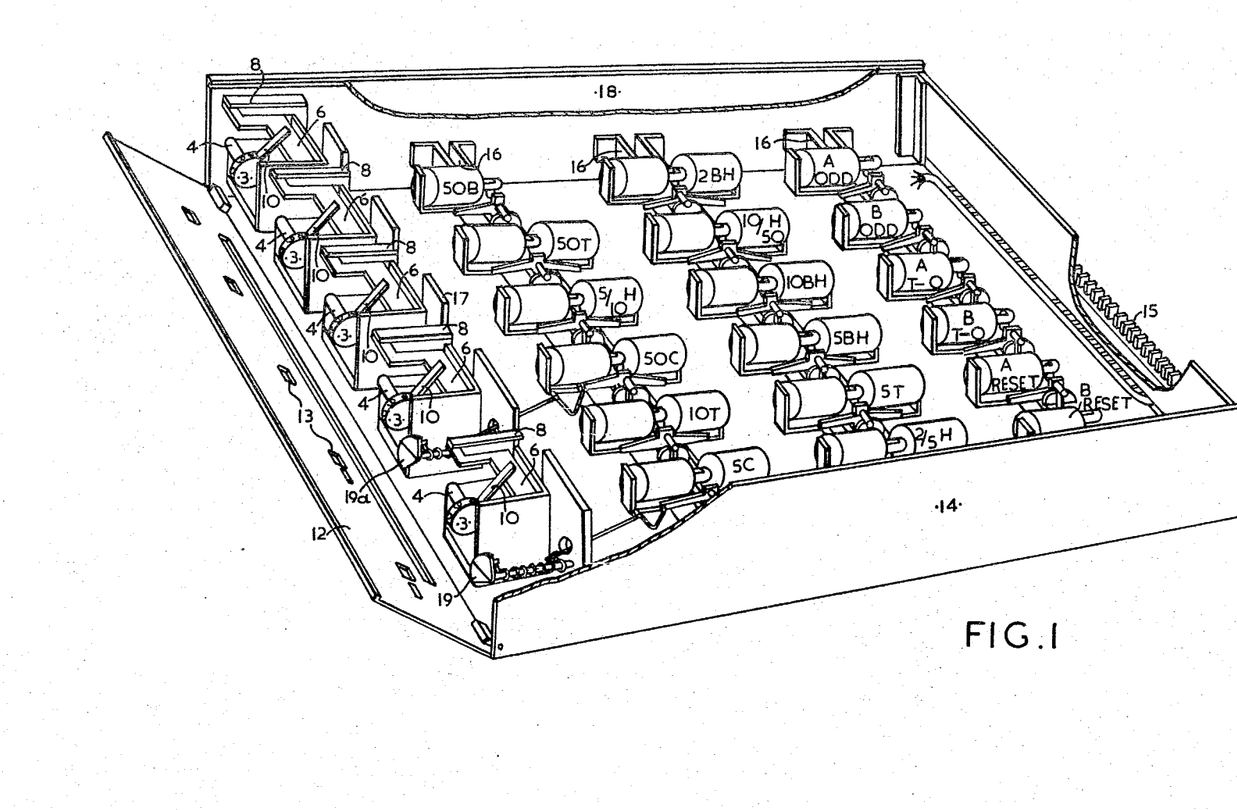
FIG. 1 shows the physical layout of relays and other components in aggregating apparatus constructed according to this invention.
Figure 1A:
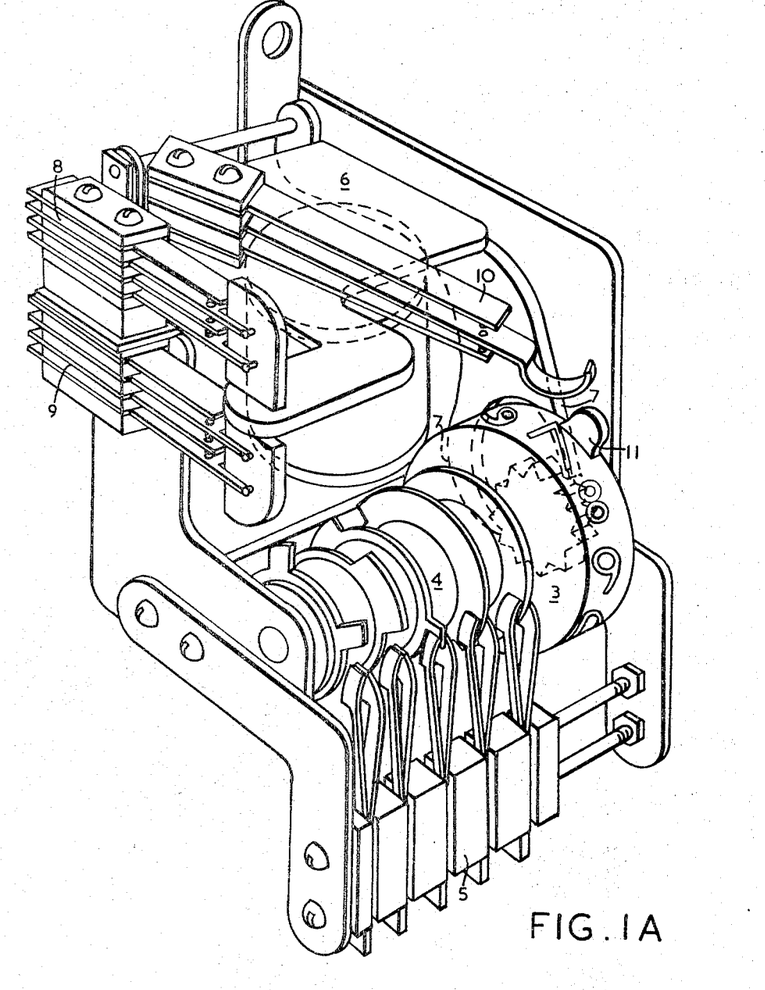
FIG. 1A shows in greater detail and on a larger scale one of the stepping units in the counting device used in the invention and is viewed in perspective from the front.

As shown by the drawings the preferred embodiment combines in the aggregator apparatus a decimal counting device with a visual indicator of the kind described in copending application No. 310,711. It should be understood, however, that this device may be substituted by any other suitable device so long as modification of the circuitry can be effected in accordance with known practices. The counting device shown in the drawings comprises stepping units U1, T1, H1, TH1 and TTH1 with associated electromagents, individual visual indicating drums 3 and contact wiper cylinders 4 with coacting spring sets 5. The knife-like contacts of these spring sets 5 are shown schematically in FIG. 2 by the upright strokes at the foot of the drawing and as above described produce most of the output signals of the aggregator representative of the computed total. An armature plate 6 is displaceable by each electromagnet and carries stepping pawls 7 for sequentially stepping its respective indicating drum 3 one position with each attraction and release of the armature 6 by its electromagnet. Two sets of laterally mounted contact spring sets 8 and 9 are provided between which the armature moves. The upper set 8 are a double pair of normally closed contacts and are depicted schematically in FIG. 2 as contacts $b$, while the lower set 9 although only connected as a single pair or contacts $a$ in FIG. 2 in respect of electromagnets U1 and T1, are a double pair of contacts, the upper pair of which are normally open and the lower pair normally closed.

Figure 2A:
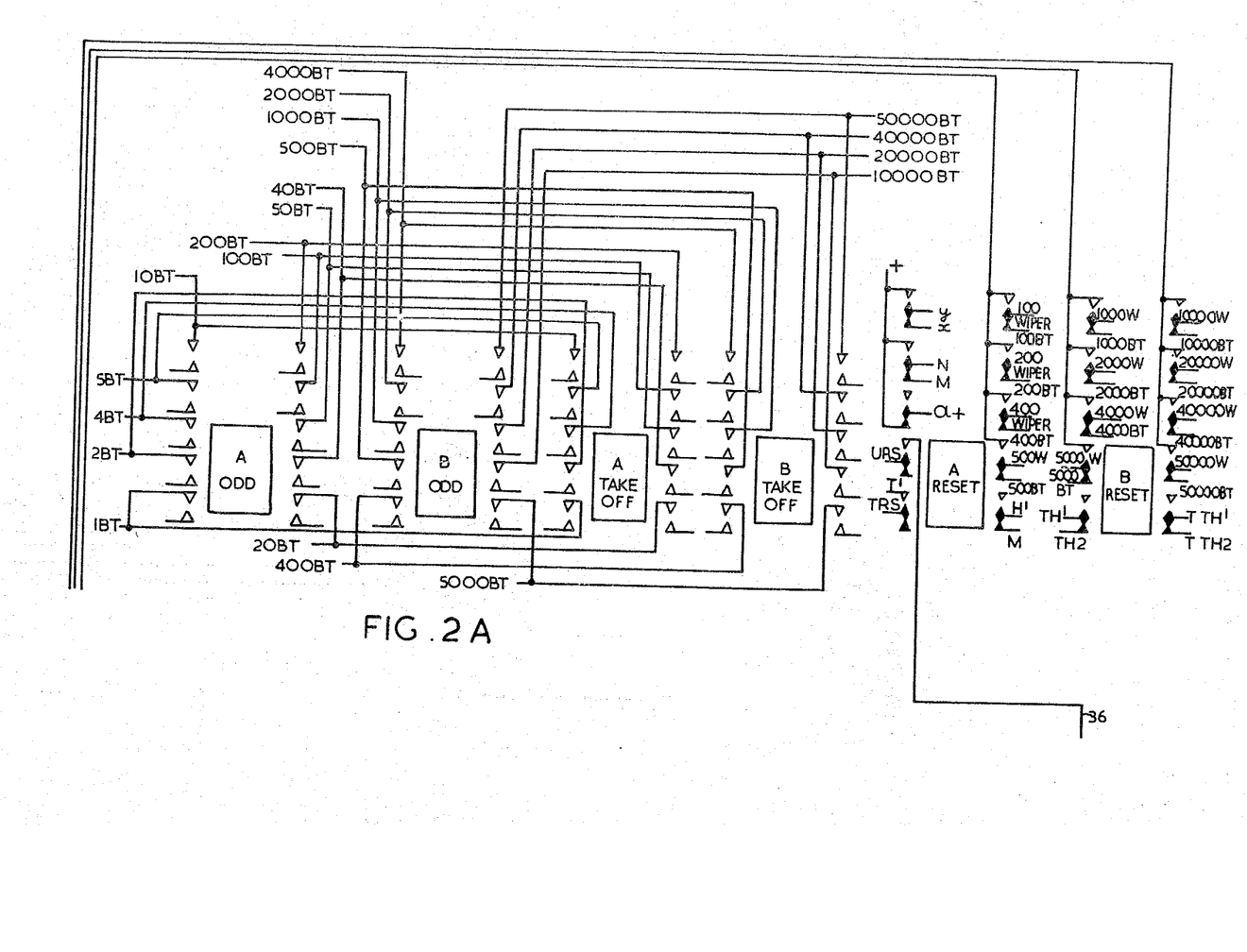
FIG. 2 shows by schematic circuit the electrical connections between the components shown in FIG. 1.
Figure 2B:
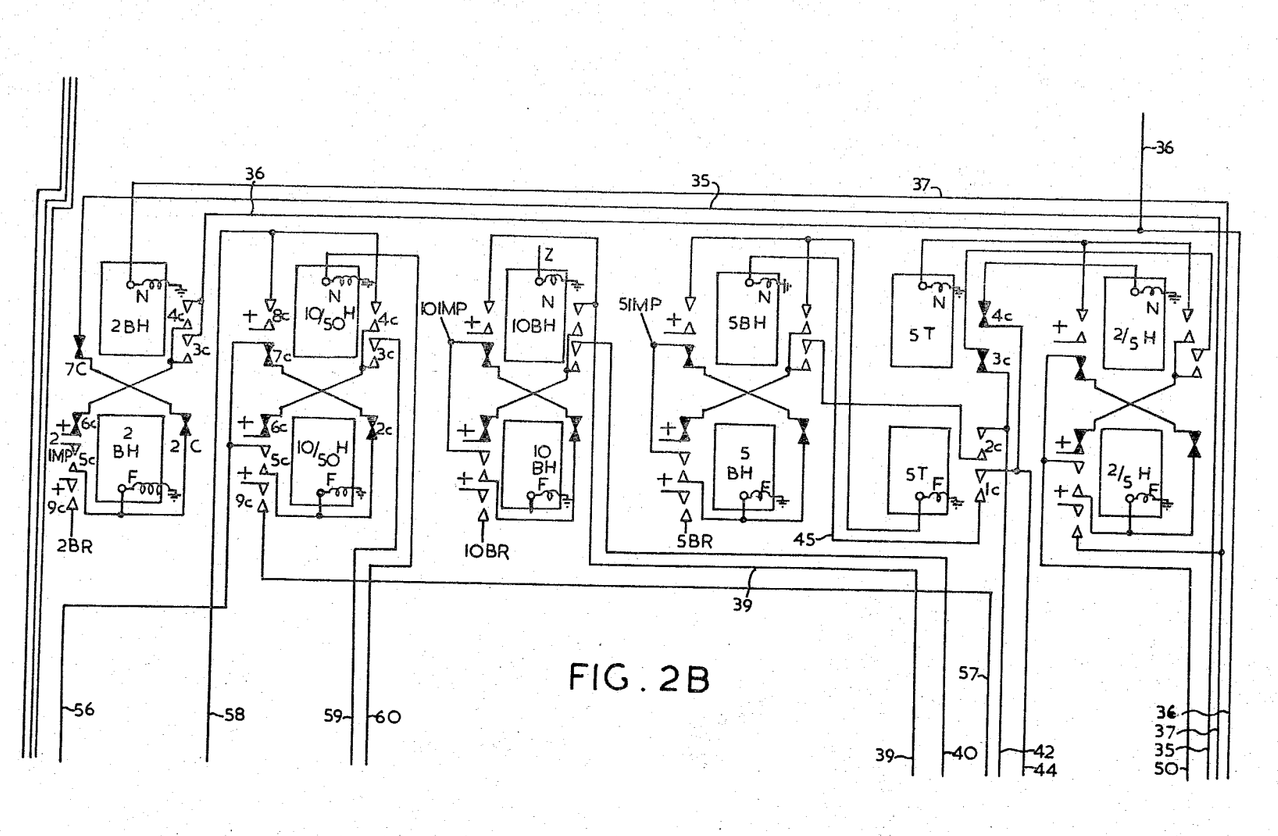
Figure 2C:
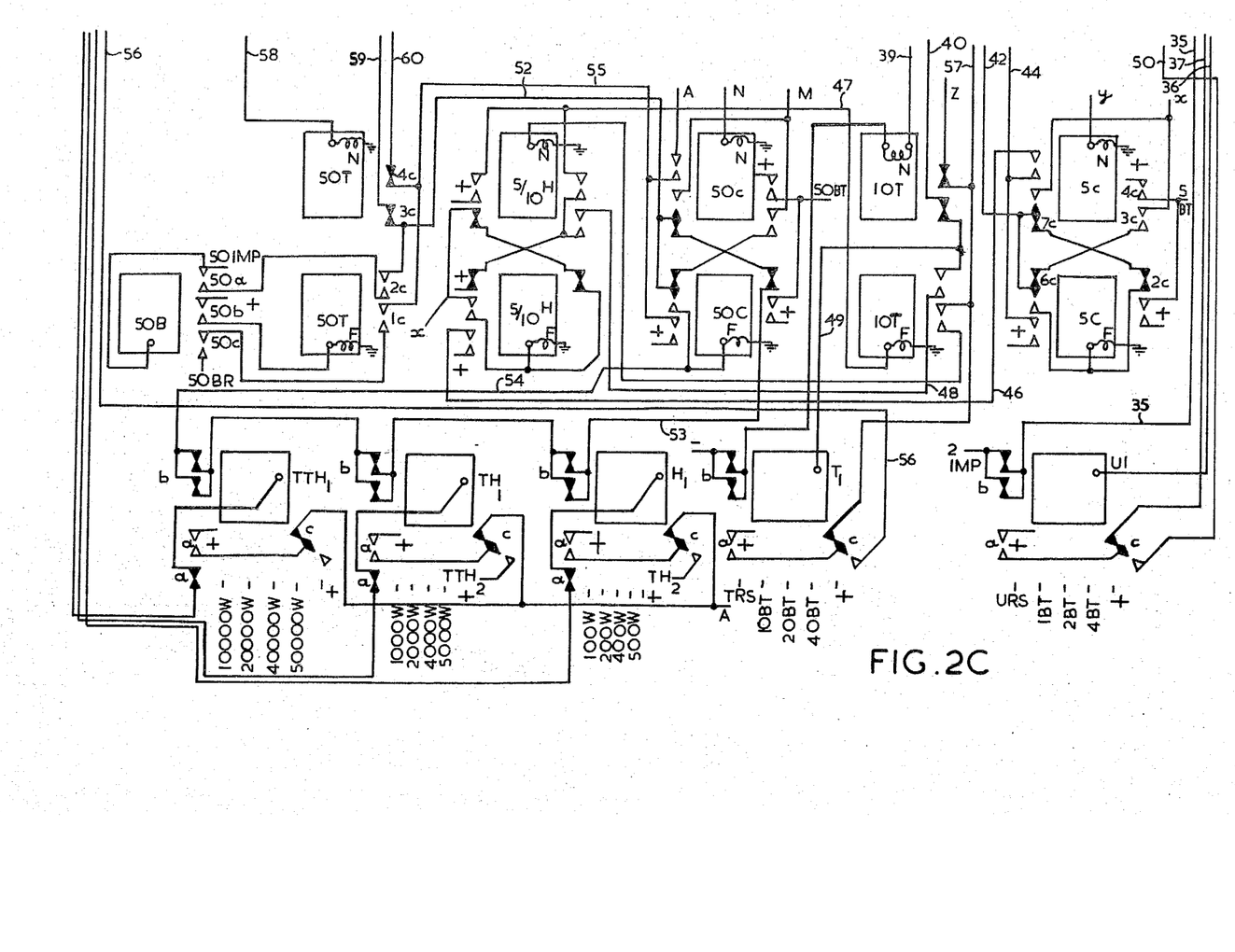

Each armature 6 carries a set of change-over contacts 10 referred to schematically in FIG. 2 as contacts $c$. These contacts are actuated by engagement with lobes or tabs 11 on the respective indicating drum. The lobes are so placed as to change over these contacts $c$ momentarily as the indicating drum signifies the start of a new sequence of calibrations. The electromagnets receive their energizing potentials from the circuitry of the aggregator proper and as each drum 3 has a total of ten calibrated positions the counting device is effectively a sequentially stepping decimal counter.

The stepping unit U1 being located at the right hand end of the line of stepping units serves to count and visually indicate the units digits of the computed total, while the other stepping units proceeding from right to left of FIG. 1 perform similar functions with respect to the tens, hundreds, thousands and tens of thousands digits, respectively. The aggregator equipment as will be described hereinafter channels signals in respect of the stepping of the stepping units to and from these units so that conversion of the totalled values from units digits to expression in the tens and hundreds digits, etc., proceeds naturally and correctly. An escutcheon plate 12 covers the line of indicating drums 3 and has a series of windows 13 through which the computed total indicated by the drums 3 can be viewed.

The arrangement disclosed in the drawings can be summarized by explaining that the output signalling means from the aggregator comprises the contacts or lines U1BT ... U4BT, T1BT ... T4BT, 10,000 ... 50,000 and 5BT and 50BT. These output signalling means may be connected to one side of respective contacts of the odd relays and take-off relays as shown, but alternatively may be connected directly to remote equipment. The former set of relays are arranged to be operated by suitable cycling equipment (not shown) or other means to connect the output signalling conditions of the aggregator, representing a total computed by the apparatus, to the remote equipment. Preferably the take-off relays also connect the output conditions of the aggregator to associated equipment for such purposes as rendering a permanent record of the total value stored, when required, and will, therefore, be manually operable. The pair of reset relays function under manual control to cancel the computed total value from the aggregator after the pay dividends have been declared by the totalisator, and restore the circuitry to a normal condition in preparation for commencement of betting on another contest.

The physical layout of the aggregating equipment shown in FIG. 1 shows a box-like tray 14 within which all of the components of the aggregator are mounted. The tray 14 will usually be accommodated on a bay into which numerous aggregator trays 14 can be slid upon supporting slides. All electrical connections carrying both input and output leads within the aggregator are terminated upon fixed terminals 15 at the rear of the tray 14. These terminals 15 are formed as elements of a portion of a connector which mates with its other portion, permanently connected to the supporting bay, when the tray 14 is slid into operating position in the bay.

Supporting rails 16 span the sides of the tray 14 and upon these the various relays of the equipment are carried. At the forward end of the tray 14 a partition wall 17 is located to the forward side of which the stepping units are mounted. A hinged escutcheon plate 12 covers this forward end and a cover panel 18 is slidable within slots in opposite sides of the tray to enclose the tray's contents.

A pair of displaceable shutters or flags 19 and 19a are operated by relays 5C and 50C, respectively, and have two positions, a normal, or concealed, position and an off-normal position where they are displayed through the escutcheon plate 12. The shutter 19 is intended to provide a visual indication of a 5 value addition which is to be added to the otherwise indicated total on the counting device. The shutter 19a, in a similar way indicates visually a 50 value addition to the indicated total. The respective shutter 19 and 19a is displayed in response to either an input signal representative of the particular value or to a signal received from a stepping device to signify that the particular value to be displayed by the shutter has been counted by the stepping of its indicating drum.

Due to the provision of these two shutters 19 and 19a in the device the calibration of both the unit's digit drum and the ten's digit drum is arranged accordingly. That is the latter has its sequential steps calibrated 1, 2, 3, 4, 0, 1, 2, 3, 4, 0. Upon stepping to the first zero in the sequence a signal is sent through the action of change-over of contacts $c$ to cause display of the 50 value shutter. A similar provision is also made in the calibration of the units digit drum but since the lowest value input signal received by the aggregator is a 2 value its sequential steps are calibrated 2, 4, 1, 3, 0, 2, 4, 1, 3, 0. It will be seen that in this case there is a duplicated double progression sequence. At the change from one progression sequence to another i.e., when stepping from its 4 to its 1 position a signal is sent via the contact $c$ of the respective stepping unit to cause display of the 5 value shutter. As a result, to the indicated 1 position of the units digit of the total, a 5 value must be added so that the total becomes 6 as a correct indication of receipt of a further 2 value input signal.

Double acting relays 2BH, 5BH and 10BH are provided and connected with inputs 2IMP, 5IMP and 10IMP respectively. These relays have their own individual circuits for operating the electromagnets of the stepping units of the indicating device or shutters as will be described later. A similar pair of relays 5C and 50C are provided which respond to either receipt of an input signal corresponding to a 5 or a 50 value, respectively, or to stepping of the U1 or T1 stepping unit respectively, from the end of one progression sequence to the start of the same or another as explained above. These relays 5C and 50C operate an individual indicating shutter 19 and 19a and mark a respective output line 5BT or 50BT.

Additional double acting relay units 2/5H, 5/10H and 10/50H are utilized for the purpose of converting the value of the unit's digit of the total and the value of the ten's digit of the total into terms of the next highest digit as the computed total progresses according to the dicimal system.

Further double-acting relays 5T, 10T and 50T are provided as switching devices to transfer energizing potentials to respective electromagnets at the proper times.

In the following description the aggregator apparatus of the invention is applied as an automatic totalling computer for the purpose of collecting the various values of stakes laid and thus computing therefrom the total value of money invested with an automatic totalisator and in respect of an individual contestant. There will, therefore, be a separate aggregator individual to each contestant in the contest to take place, and as many aggregators as the number of contestants that the totalisator is designed to handle. The total registered by each aggregator will represent the "take" in respect of all stakes wagered on a contestant in a particular event. The same equipment may also be utilized for indication of the grand total of stakes wagered on the contest and a further unit for the purpose of registering the total "pay."

Figure 3:
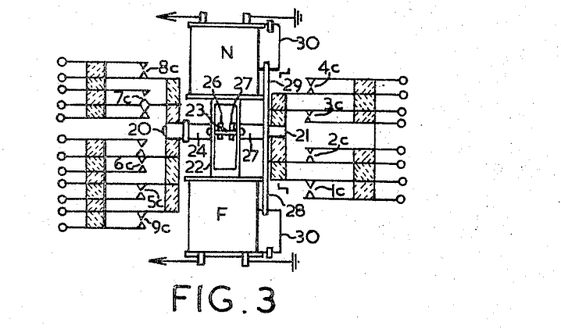
FIGS. 3 and 4 shows diagrammatically and schematically the construction and the electrical connection of double-action relays used in this aggregating equipment.
Figure 4:
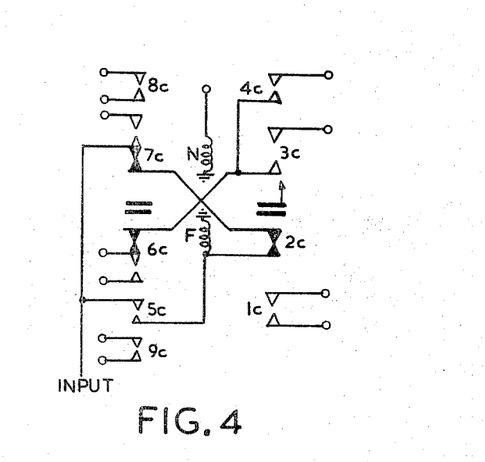

For ease of maintenance of the aggregator equipment and for ready replacement of faulty units with a minimum of delay, all of the aggregators are interchangeable. An important element of this equipment is the double-action relay which is preferably of the type described in United States Patent No. 2,558,067, filed on Apr. 5, 1949, by Roy E. Wells. A diagrammatic and schematic circuit of this kind of relay is shown in FIGS. 3 and 4, respectively, of the present drawings and its operation is described briefly as follows.

Two separate confronting solenoids N and F are shown having a common plunger 22. To the left of the solenoids transiently operated contact spring sets having contacts 8c, 7c and 6c, 5c, 9c are located while to the right of the solenoids holding contact spring sets having contacts 4c, 3c and 2c, 1c are located. As depicted in the drawing the contacts 6c and 7c are change-over contacts but they are in parts of the circuit of the aggregator connected as ordinary make and break contacts. Members 24 and 25 are U-shaped brackets having inner bifurcated ends 26 and 27 with displaceably actuating rollers 20 and 21, respectively, which serve as striker arms on their ends which move to change over the transient contacts and holding contacts, respectively, in a manner to be described. Lateral wings or arms 28 and 29 are formed on the outer leg of the member 25 and are engaged at their ends by loop springs 30. A stud 23 bridging a longitudinal slot in the plunger 22 passes within the forked end of the lever members 24 and 25 with the forked end 27 of the member 25 closely encircling the stud 23, while the forked end 26 of the lever 24 has a spacing between the forks at its end substantially greater than the diameter of the stud 23. After one or the other of the solenoids N or F have been energized and then deenergized, the resiliency in the transient contact spring sets restores the plunger 22 to the position shown in FIGS. 3 and 4. This is the condition of rest of the relay. Due to the action of the loop springs 30 on the lever 25 as well as the excessive width of the forking of its end 27 the lever 25 will be biased to one or the opposite over-centre positions from which it must be forcibly displaced by an opposite movement of the plunger 22. The excessive width of the forks of the lever 25 is such as to permit actuating roller 20 associated with the transient contacts to restore to normal from an off-normal position without causing the stud 23 to actuate the other roller 21. Restoration of the latter roller 21 to its normal condition can only be effected by displacement of the roller 20 to its opposite off-normal position from that occupied previously. FIG. 4 shows by schematic circuit the double-action relay as used in the aggregator equipment with the striker arms 20 and 21 in a normal condition. The symbol $\uparrow$ is used to represent the striker arm 20 associated with the transiently operating contacts, and the symbol $=$ to represent the contact striker arm 21 associated with the holding contacts which are those located in a vertical line passing through each of these respective symbols. In every instance the striker arm $\uparrow$, i.e. 21, must be in one of its biased positions as it has no mid-position, and one of these, namely the position influenced by energization of winding N, considered throughout this specification as its zero or normal position.

In operation under the conditions of use to which these relays are submitted, in the equipment under consideration marking potential if applied to the winding F displaces the plunger 22 and simultaneously moves both plungers $=$ and $\uparrow$ to similar off-normal positions thereby effecting change over of the contacts 6c, 5c and 9c associated with striker arm $=$ while changing the other striker arm to its $\overline{\uparrow}$ position and changing over simultaneously all of its associated contacts 1c to 4c. Upon removal of the marking potential from the winding F the striker arm $\overline{\uparrow}$ restores to normal and returns all of its associated contacts to their normal condition. The striker arm $=$ remains in its off-normal condition. If marking potential then be applied to winding N the striker arm $=$ is displaced to its opposite off-normal condition while the striker arm $\overline{\uparrow}$ is returned to its alternate, i.e. normal position $\uparrow$. Release of potential on the winding N will then permit striker arm $=$ to return to its neutral or normal position. As a result of the above explained operation of the relay, under normal conditions of use, as applied in the present equipment, it will be seen that the contacts associated with striker arm $=$ are only transiently operated during the persistence of energization of either of the two windings F and N.

The operation of the aggregator circuit illustrated schematically in FIG. 2 will now be described in respect of receipt of an input signal representative of a $2 bet. By any suitable means a marking potential is applied to the two lines 2IMP, which on the one hand appears across the contacts b of the stepping unit U1 and is transmitted via the line 35 across the normally closed contacts 7c and 2c of relay 2BH to its winding F which displaces both striker arms of the relay to a corresponding off-normal condition. With energization of this relay the contacts 2c, 3c and 4c changeover as do contacts 6c, 5c and 9c. Over contacts 5c, now made, the potential to winding F is maintained. Closure of contacts 9c marks line 2BR which serves to disconnect the signalling machine and thus removal of potential on line 2IMP. Pending disconnection, however, contact 5c ensures that the F winding continues to receive potential from the line 2IMP.

When the winding F is deenergized, striker arm $=$ restores and its contacts 6c, 5c and 9c return to normal. Potential is then applied over contacts 6c, through now closed contacts 3c and 4c, line 36 to the energizing coil of the electromagnet of stepping unit U1. Its magnet is then attracted to partly step its indicating drum around one position. The stepping is completed when the magnet releases. This follows from closing of contacts a of the electromagnet U1 which sends potential through contacts c, line 37 to winding N of relay 2BH which will move the striker arms $=$ and $\overline{\uparrow}$ to their upper position as shown to open contacts 6c and 3c, 4c and deenergize the coil of electromagnet U1. Completion of stepping to its next position opens contacts a and relay 2BH reverts completely to its normal condition in readiness for the next $2 bet. From the foregoing description it will be appreciated that receipt of marking potential on the line 2IMP has resulted in stepping of the stepping unit U1 from one position to another, advanced, position.

When an impulse representative of a $10 be is received it enters via the line 10IMP and through contacts 7c and 2c of relay 10BH and energizes the winding F of this relay. Closing of contacts 5c and 9c serve the same purpose as with relay 2BH and disconnection of the signalling machine is effected over line 10BR. Upon release of striker arm $=$, therefore, potential is applied via contacts 6c and 4c, now closed, through line 39 to one side of the winding N of relay 10T. The other side of this winding is connected to negative potential through the contacts b of stepping unit T1. As will become more apparent from the following descrpition energizing of the coil of the electromagnet of stepping unit T1 may be derived through the contacts of relay 5/10H as well as relay 10BH. The relay 10T will be energized through either its F or N winding depending upon which of these two relays is in condition to energize the electromagnet of stepping unit T1. Therefore, the potential applied over line 39 to the winding N of relay 10T is to ensure that (the striker arm ↑ is in its correct position so that potential may be applied through its contacts to the stepping unit T1. The purpose of connecting the contacts b into the energizing circuit of the winding N is to ensure that change-over of relay 10T does not occur while the armature of the stepping unit T1 is performing a stepping operation.

The potential applied across contacts 6c of relay 10BH passes through now closed contacts 3c, over line 40, through now closed contacts 3c of relay 10T, line 49 to the energizing coil of the electromagnet of stepping unit T1. With stepping of the armature and hence closure of contacts a potential is applied through now closed contacts 4c of relay 10T to line Z and to the winding N of relay 10BH. This relay is then restored to normal after stepping of the electromagnet T1 is completed. As a result of the above explained operation of the circuit the stepping unit T1 is stepped from one position to the next to provide for registration and visual indication of a $10 bet.

The registration of a $5 and $50 bet differs from that described in connection wtih the earlier bets of $2 and $10. When marking potential is applied to the line 5IMP the winding F of the relay 5BH is energized via contacts 7c and 2c and locked on for the duration of the marking potential across contacts 5c. A marking condition from the potential line is passed across contacts 6c and 4c of relay 5BH and via line 41 to the winding F of relay 5T. Simultaneously from contacts 3c, now closed, potential is applied via contacts 2c of relay 5T, now operated, line 42, and contacts 7c and 2c of relay 5C to operate its winding F. To the plunger of this relay is attached suitable linkage to operate a shutter 19, or displace a flag, to give visual indication of registration of a $5 bet. The relay 5C becomes locked on over the lower pair of its contacts 6c which have now changed over. The potential applied across these contacts is obtained via line 42, contacts 2c of relay 5T and contacts 3c and 6c of relay 5BH. While the striker arm ⊤ of relays 5BH, 5T and 5C remain in their off-normal condition this potential continues to be applied to winding F. However, closure of contacts 5c of relay 5C transmits potential over line 44 and through now closed contacts 1c of relay 5T to energize winding N of relay 5BH. The striker arms = and ⊤ of this relay then are moved to their upper positions to disconnect the potential applied over line 42 and so release striker arm = of relay 5C which through opening of its contact 5c deenergizes winding N of relay 5BH. This relay then reverts to normal in readiness for receipt of a further $5 signal, while the striker arms ⊤ of relays 5T and 5C remain off-normal and by virtue of this the $5 shutter remains displayed.

With actuation of winding F of relay 5C contacts 1c close and mark the outgoing signalling line 5BT to provide relay of the recorded $5 bet to remote equipment. Line 5BT is also connected to the fourth left hand contacts of the odds relay A for a purpose to be described later.

It will be assumed that the next bet to be registered in the aggregator equipment is a further $5 wager. As previously explained in connection with the operation of the basic double-acting relays of the circuitry, the off-normal position of the two relays 5T and 5C and the normal position of the relay 5BH with deenergization of their windings N and F as is now their condition, their spring sets containing contacts 1c, 2c and 3c, 4c will be in their off-normal positions in respect of relays 5T and 5C and in their normal position in respect of relay 5BH while the spring sets containing contacts 5c, 6c, 9c and 7c, 8c will have returned to their normal condition as shown in the drawing in respect of all three relays. Thus the presence of a marking potential upon the line 5IMP representative of a further $5 wager will cause energization of the winding F of relay 5BH which will in the manner previously described close the contacts 9c to disconnect the signalling wages receiving machine from the line 5IMP.

After this function and the consequential return to normal of striker arm = of relay 5BH a marking pulse will again be applied via its contacts 6c to the mover arm of contacts 6c of relay 5C where it is transferred across the upper half of these contacts via contacts 3c, now closed, to the line X and then across the normally closed fifth left hand contacts of the reset relay to the line Y and thence to the winding N of relay 5C. As a result the striker arm ⊤ of the relay 5C is drawn to its normal position and striker arm = to an upper off-normal position so that the applied marking potential on line 42 continues to be relayed to line X now across the upper half of contacts 7c of the relay 5C. With this actuation of the relay 5C the shutter or flag 19 (see FIG. 1) is returned to its normal condition thus ceasing to indicate a $5 value.

Furthermore line X is also connected to the normally closed contacts 7c of relay 5/10H and via contacts 2c to the winding F of this relay. Under the conditions now under discussion, therefore, this winding becomes energized and locks on over its contacts 5c which now become closed. Potential is applied over contacts 9c of the 5/10H relay, line 46, the now closed contacts 8c of relay 5C, line 44, closed contacts 1c of relay 5T and line 45 to energize the winding N of relay 5BH to restore the striker arms of this latter relay to their normal position which will follow upon removal of the marking pulse on the line X. This is achieved upon energization of the winding N of relay 5BH due to the opening of its contacts 3c and 4c and thus removal of the marking potential normally applied across contacts 7c of relay 5C to the line X. The resulting release of winding F of relay 5/10H returns the striker arm = to normal and closes contacts 6c which transmits potential thereacross and across contacts 4c, now closed, of this relay to line 47 and the winding F of relay 10T. Potential is also applied across the now closed contacts 3c of relay 5/10H and line 48, contacts 2c, now closed, of relay 10T and line 49 to the coil of the electromagnet of stepping unit T1 so as to initiate stepping of this unit to its next position to provide visual registration of a $10 value which is an effective totalling of the two successive $5 bets just received. Closure of contacts a of stepping unit T1 places potential through contacts c and contacts 1c, now closed, of relay 10T to energize winding N of relay 5/10H and restore relay 5/10H and its striker arms to normal in readiness for receipt of another signal indicative of a binary function of relay 5C.

As previously explained the stepping unit U1 is calibrated in such a way as to receive and visually indicate the units digit of the total of the aggregated stakes received in respect of wagers made on the contestant individual to the aggregator equipment under consideration. As the smallest stake value that the equipment of this embodiment is designed to accept is $2 the indicating drum on this stepping unit has ten positions, viz. 0, 2, 4, 1, 3, 0, 2, 4, 1, 3 which as can be seen represents a double series each containing two separate progression sequences. Therefore, should the first and subsequent bets registered be of $2 value it is intended that the stepping unit U1 steps successively from 0 to 2; to 4; to 1 with simultaneous operation at the latter position of the $5 indicating shutter 19 thus representing a total recorded value of 6; and 3 to represent a total recorded value of 8; and then to 0 with automatic stepping of stepping unit T1 to its first position above its 0 setting. Simultaneous release of the $5 indicating shutter should also result. As viewed through the indicator escutcheon plate a total value of $10 will be shown.

As the equipment is also designed to accept wagers involving values of $50 units the tens digit indicating drum is calibrated in steps in two repeated progression sequences, viz. 0, 1, 2, 3, 4, 0, 1, 2, 3 and 4. It is intended therefore, that upon receipt of a signal representing a $10 value bet or indicative of the stepping unit U1 having completed a full rotation, or a duplicated operation of relay 5C, the stepping unit T1 will be rotated one step. Upon receipt of a $50 value bet, or upon transit of the indicating drum associated with stepping unit T1 from one of its positions labelled 4 to the adjacent position labelled 0, a shutter is displayed to indicate that $50 is to be added to the total indicated by the calibrated indicating drums.

In this way $10 value bets registered will increase the total from $40 as indicated by the stepping unit T1 to $50 when the indicating drum reveals 0 and the $50 shutter 19a (see FIG. 1), is displayed. In a similar way $60, $70, $80 and $90 will be indicated by increasing steps of the stepping unit T1 until upon stepping of its indicating drum to its other 0 position the stepping unit H1 indicative of the hundreds digit of the grand total is advanced one position. This and the other stepping units indicative of higher order digits of the grand total have indicating drums graduated in ten steps from 0 to 9 so that the stepping unit of the next higher order is stepped once upon completion of each revolution of any of these stepping units.

It has previously been explained that upon receipt of each $2 bet, relay 2BH is operated across its winding F and the stepping unit U1 stepped on by potential applied across contacts 6c of this relay. Each time the unit steps, its contacts a close to apply potential through the upper half of the contacts c to the winding N of relay 2BH to restore the relay 2BH to normal in readiness for further incoming signals representative of $2 bets. If, however, the stepping unit U1 upon receipt of an impulse steps from one of its positions labelled 4 onto its next position labelled 1, the contacts c are actuated by one of the tabs carried upon the periphery of the indicating drum so that the bottom half of these contacts c are now made. Thus the potential applied through contacts a is connected to line 50 and through normally closed contacts 7c and 2c of relay 2/5H to its winding F. Through the contacts 9c actuated by the striker arm = of relay 2/5H potential is applied by line 37 to the winding N of relay 2BH for restoring purposes as previously explained. The pulse across the contacts a of the stepping unit U1 is momentary, as previously explained thus permitting the striker arm = of relay 2/5H to return to normal. When this condition is obtained potential is applied through contacts 6c and 4c, now closed, to the winding N of relay 5T and through contacts 3c of relay 2/5H and via normally, and now, closed contact 3c of relay 5T, line 42, contacts 7c and 2c of relay 5C to its winding F to provide for display of the $5 value shutter 19.

On the other hand, should this shutter be already displaying a $5 value, i.e. relay 5C having its striker arm ⊤ off-normal, the applied potential will be applied through contacts 6c and 3c, now making, to the line X which, as previously described will result in stepping of the stepping unit T1 to an advanced position. Thus movement of the unit from a position labelled 4 or 3, to its next advanced position labelled 1 or 0, respectively, will send a pulse along the line 50 either to display the $5 shutter, or if already displayed, to withdraw the shutter and step the unit T1.

Upon receipt of a signal representative of a $50 value bet marking potential is applied to the line 50IMP and to the winding of a simple single winding relay 50B. Potential is then applied across the now closed contacts 50b to the winding F of double-acting relay 50T while the signalling pulse is passed across contacts 50a and contacts 2c, now closed, of relay 50T via the line 52 and normally closed contacts 7c and 2c of relay 50C, line 53 and the serially connected normally closed contacts b of the stepping units H1, TH1 and TTH1 and the return line 54 to the winding F of relay 50C. Operation of this winding displays the shutter 19a indication of a $50 value. Simultaneously, potential is applied through now closed contacts 1c of relay 50C to the 50BT line for remote indication of registration of this value. Also by means of closure of contacts 9c potential is applied by line 55, through contacts 1c of relay 50T and contacts 50c of relay 50B to the 50BR line to disconnect the signalling bet receiving machine. The purpose of connecting the b contacts of the three stepping units H1, TH1 and TTH1 into the energizing circuit for the winding F of relay 50C is to ensure that these units are not stepping at the time that the $50 value shutter is operated.

If the equipment is in a condition where the $50 shutter 19a is displayed and the next bet received is of a further $50 value the line 50IMP is again marked and relay 50B energized. With closure of the contacts of this relay potential is applied across its contacts 50a to the previously closed contacts 2c of relay 50T, via line 52 and the already closed contacts 6c and 3c of relay 50C to the line M. This line M is connected through the normally closed bottom half of the fourth contacts on the left hand side of the A winding of the reset relay to the line N. This line N is connected to the winding N of relay 50C, so that the potential now applied thereto draws two striker arms of this relay to their upper positions. By change over of contacts 7c of this relay the marking potential is maintained on line M and the displayed shutter is withdrawn. Simultaneously by opening of contacts 1c and 4c marking of the line 50BT is removed. Also the line A is connected across contacts 8c of relay 50C to the line 55 and thence through contacts 1c of relay 50T and contacts 50c of relay 50B to the 50BR line. The A line is connected as shown at the bottom of FIGURE 2 to the normally closed side of contacts c of the stepping units H1, TH1 and TTH1 and received potential upon closure of contacts a of any one of these units. This will then be effective to disconnect from the 50IMP line the signalling bet receiving machine. Through the first right hand contacts of the A winding of the reset relay the M line is also connected to the energizing coil of the electromagnet of the stepping unit H1 so that potential upon this line attracts the armature to initiate stepping of the indicator drum serving to total the values in the hundreds digit of the computed total and thus cause closure of the respective contacts a. In this way, as previously explained, potential is applied to the line A for ultimate disconnection of the marking condition on the line 50IMP. When this occurs line M, and therefore the energizing coil of the electromagnet of stepping unit H1 cease to receive potential so that the electromagnet is released for the unit to complete its stepping function and open its contacts a. It will now be seen that upon completion of this sequence of events that the striker arms = and ↑ of the relay 50C have restored to normal but the $50 shutter has been withdrawn, but that, furthermore, the indicating drum of the stepping unit H1 has been advanced one position. The receipt of two input signals respective of two consecutive $50 value bets has resulted in registration and visual indication of a $100 addition to the total.

It will now be assumed that display of the $50 shutter is to result from continued stepping of the unit T1. It should now be apparent that as the unit T1 steps from a position indicative of $40 to its adjacent 0 position, a suitably located tab on the indicator drum causes the contacts c of this magnet to change over so that potential is then applied through the contacts a and c of stepping unit T1, via the line 56 and the normally closed contacts 7c and 2c of relay 10/50H to its winding F to attract to their lower positions the two striker arms. Potential is maintained to the winding F across the now closed contacts 5c of this relay. By means of closure of contacts 9c of this relay potential is applied across the line 57 and the closed contacts 4c of relay 10T to the line Z and thence to the winding N of the relay 10BH to restore it to normal. This in the manner described causes deenergization to the coil of the electromagnet of unit T1 to permit its armature to complete the stepping operation. Its contacts a and c then revert to normal and winding F of relay 10/50H becomes deenergized and releases its striker arm =. As a result potential is applied across contacts 6c and 4c, line 58 to the winding N of relay 50T, and also across now closed contacts 3c of relay 10/50H and via the line 59 contacts 3c of now energized relay 50T, line 52 and contacts 7c and 2c of relay 50C and the contacts b of the final three stepping units to the winding F of relay 50C. This results in display of the $50 shutter 19a. Potential now applied through contacts 5c of relay 50C and over line 55, through contacts 4c of relay 50T and line 60 is connected to the winding N of relay 10/50H to restore it to its normal condition. Continued stepping of the unit T1 will then provide visual indication of its labelled positions 1, 2, 3 and 4 which by the addition of the $50 value displayed by the shutter 19a will effectively indicate total values of $60, $70, $80 and $90.

If the stepping unit T1 now commences stepping to its next position potential is again applied across contacts a and c, the latter being now actuated by a second tab on the indicating drum, through the line 56 to the winding F of relay 10/50H as just described. Due to this the line 52 now applies potential through contacts 6c and 3c, now closed, of relay 50C to the line M to operate winding N of this relay and thus withdraw the shutter, as well as to step on the stepping until H1 both of which functions have been recently described.

Conversion of the value represented by the hundreds digit into terms of the thousands digit is achieved when say the stepping unit H1 steps from its position labelled 9 to its following position labelled 0. In initiating this movement the magnet's contacts a and c are operated so that potential is then applied to the line TH2 which is connected to one of the first pair of contacts to the left of the B winding of the reset relay and across these normally closed contacts to line TH1 and thence to the energizing coil of the stepping unit TH1. With this energization of the TH1 coil and its subsequent release when the stepping unit H1 has completed stepping, will result in stepping of the unit TH1 to its next position thereby indicating a further $1,000 value in the total which is consistent with the previously counted ten $100 values. In a similar way the unit TTH1 is stepped on one position with each complete revolution of the unit TH1.

In this way the indicating drums of the indicating device serve individually to indicate totals in respective digits of an aggregated grand total, and regardless of what value bets are registered in the aggregator equipment each stepping unit will automatically function to indicate a true decimal total in response to progressive counting of values by the indicating drums representative of digits of lower order.

Reference is now made to the two windings A and B of the resetting relays. These relays are manually operable to cancel from the aggregator equipment the total value previously computed and which is no longer required. This condition arises at the conclusion of each contest after dividends to be paid in respect of winning contestants have been declared. The equipment is then required to be restored to normal in readiness for betting transactions on a later contest. This will then require that regardless of which position the indicating drums have been stepped to, each electromagnet must be returned to its zero, or home position. Simultaneously it is necessary to ensure that all of the relays in the equipment are restored to their normal condition and that those connections through which impulsing signals may at that time be passing, are also broken. This latter function is obtained by change over of the fourth and fifth contacts to the left hand set of winding A and the first contacts of the remaining sets of both windings A and B. Across the second contacts of this set the signalling contact URS is connected, upon operation of the reset relay to line 36 and the coil of the electromagnet of the stepping unit U1. The contact URS is supplied with positive potential for every position of the indicating drum excepting its zero position so that through the second contacts of the A winding of the reset relay stepping unit U1 is "homed" when required. A similar provision is made across the first contacts of the left hand set of the A winding where contacts TRS are connected to the coil of the stepping unit T1.

Resetting of the remaining three stepping units is performed across the second, third, fourth and fifth contacts of both sets of the B winding and the right hand set of the A winding. It will be seen that the energizing coil of each of these three stepping units is connected to respective sets of contacts the other sides of which are connected to wipers associated with the same stepping unit. That is, the coil of the stepping unit H1 upon operation of the reset relay will be connected with each of the four wipers 100W, 200W, 400W and 500W. Since potential is applied to one or more of these wipers for every position of the indicating drum of the stepping unit H1 excepting its zero position, the stepping unit H1 will be caused to step to its zero position. A similar operation is obtained with the other stepping units TH1 and TTH1.

The embodiment above described is merely exemplary of the relationship between the various values of bets that the equipment is capable of accepting. It would be quite a simple matter, for instance, to provide also for a $500 stake. It is also possible to change the minimum value stake from $2 to either $1, $3, $4 or $5. In fact, it is not even necessary that a $5 be accepted by the equipment. Depending upon which value stake is to be accepted the units digits indicating drum 3 will be calibrated according to the following table:

| Stake Value | Drum Calibrations |
|---|---|
| 1 | 1  2  3  4  ⓪  ①  ②  ③  ④  0 |
| 2 | 2  4  ①  ③  0  2  4  ①  ③  0 |
| 3 | 3  ①  ④  2  ②  ③  1  4  ③  0 |
| 4 | 4  ③  2  ①  0  4  ③  2  ①  0 |

In the above table the circle around certain value calibrations represents that simultaneous with appearance of these values the $5 shutter 19 is displayed to portray a $5 increase to the otherwise indicated total.

The aggregator equipment is, therefore, quite flexible and thus readily adaptable to service with different relative values.

What I claim is:

1. Electrical aggregating apparatus comprising decimal stepping counters each for recording the value of a respective digit of the summated total, input circuits for receiving individual signals representative of respective input values to be recorded and summated in the apparatus, a relay device having two off-normal positions, two groups of contacts of said relay device, one of said groups being operable between two bistable positions one of which is the home condition of said group of contacts, and the other of said groups of contacts being transiently operable with energization of said relay device, a connection to said relay device from an input circuit to operate said relay device to an off-normal position other than said home condition of said bistable groups of contacts upon receipt of a signal from said input circuit, means for generating through a pair of said transiently operated contacts an electric pulse acknowledging receipt of said input signal, means including a pair of said transiently operated contacts and a pair of said bistable contacts to transmit an actuating pulse to one of said stepping counters, contact means on said one of said counters operable with actuation of said counter to transmit to said relay device an electric pulse to operate said relay device to the other of its said off-normal positions to disconnect said actuating pulse to said counter and return said group of bistable contacts to said home condition in readiness for receipt by said relay device of a further input signal.

2. Electrical aggregating apparatus as claimed in claim 1 wherein said relay device is connected with the decimal stepping counter for recording the units digit of the summated total, and a second relay device having two off-normal positions is connected between another of said input circuits and the decimal stepping counter for recording the tens digit of the summated total.

3. Electrical aggregating apparatus as claimed in claim 2 wherein electrical marking means are provided in all counters for marking predetermined ones of signalling leads so that all of said marking means collectively indicate electrical conditions representative of the summated total.

4. Electrical aggregating apparatus for collecting and computing the progressive total of unitary values in the order of 2, 5 and 10 applied thereto, said apparatus comprising a units digit counter; a tens digit counter; a binary counter for registering units of 5 value; input circuits for receiving signals representative of the unitary values of 2, 5 and 10; a plurality of primary control relays; connections extending from said input circuits through respective ones of said primary control relays to said units digit counter; said tens digit counter and said binary counter respectively; means for generating a transfer signal from said units digit counter whenever the count therein attains a 5 value; a first secondary control relay connected to receive said transfer signal from said units digit counter; means for applying the output of said first secondary control relay to said binary counter; means for generating a transfer signal from said binary counter upon each 2 count thereof; a second secondary control relay connected to receive said transfer signal from said binary counter; and means for applying the output of said second secondary control relay to said tens digit counter, whereby said tens digit counter and said binary counter respond to control signals from either their respective primary control relays or secondary control relays.

5. Electrical aggregating apparatus as claimed in claim 4, further comprising a first distributing relay serially connected between said binary counter and its respective primary and secondary control relays, a second distributing relay serially connected between said tens digit counter and its respective primary and secondary control relays, and means provided in each of said distributing relays for disconnecting one of its associated control relays whenever a signal is transmitted from the other of its associated control relays.

6. Electrical aggregating apparatus as claimed in claim 4 for collating additionally values of 50, and further comprising a second binary counter for registering said units of 50 value, primary and secondary control relays connected to said second binary counter, an input circuit for receiving signals representative of a 50 value, a connection from said 50 value input circuit to said second binary counter through its respective primary control relay, means for generating a transfer signal from said tens digit counter whenever the count therein reaches a 50 value, means for applying said transfer signal from said tens digit counter through the secondary control relay respective to said second binary counter, and a distributing relay connected between said second binary counter and its respective primary and secondary control relays to prevent both of said respective primary and secondary control relays from signalling simultaneously to said second binary counter.

References Cited

UNITED STATES PATENTS

| | | | |
|---|---|---|---|
| 2,345,212 | 3/1944 | Nelson | 235—92 |
| 2,563,041 | 8/1951 | Johnston | 235—92 |
| 3,051,384 | 8/1962 | Lange | 235—92 |
| 3,080,114 | 3/1963 | Lange | 235—92 |

DARYL W. COOK, *Acting Primary Examiner.*

MAYNARD R. WILBUR, *Examiner.*

G. MAIER, *Assistant Examiner.*